(Model.)

L. A. PURPER.
WINDMILL.

No. 246,977. Patented Sept. 13, 1881.

WITNESSES:
Carl Kay
Otto Risch

INVENTOR
Louis Adolphe Purper
BY Paul Goepel
ATTORNEY

UNITED STATES PATENT OFFICE.

LOUIS A. PURPER, OF PARIS, FRANCE.

WINDMILL.

SPECIFICATION forming part of Letters Patent No. 246,977, dated September 13, 1881.

Application filed April 1, 1881. (Model.) Patented in France June 2, 1880, and in Germany July 2, 1880.

*To all whom it may concern:*

Be it known that I, LOUIS ADOLPHE PURPER, merchant at Paris, French Republic, have invented certain new and useful Improvements in Windmills, of which the following is a specification.

This invention relates to improvements in horizontal rotary windmills, by which the force of the wind is utilized in a high degree, whatever be the direction of motion of the same. The improved construction is furthermore adapted for utilizing also winds which move in different directions, so as to render the main currents as well as the counter-currents in their full power useful for the motor.

The invention consists of a rotary windmill in which radial paddles are applied to a vertical shaft within a square casing or housing, the side walls of which are partly open and partly closed by movable panels and provided with hinged and braced wings for conducting the currents to the paddles in the casing. By shifting the position of the movable panels in the walls of the casing, and also the wings, so that the open portions are transferred from one part of the walls to the other, the wheel may be turned to the right or left, as desired.

The top of the casing is provided with openings for utilizing the downward pressure of the current.

Figure 1:
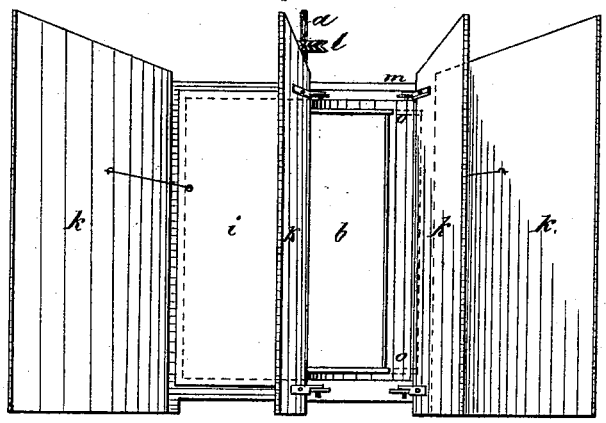
Figure 2:
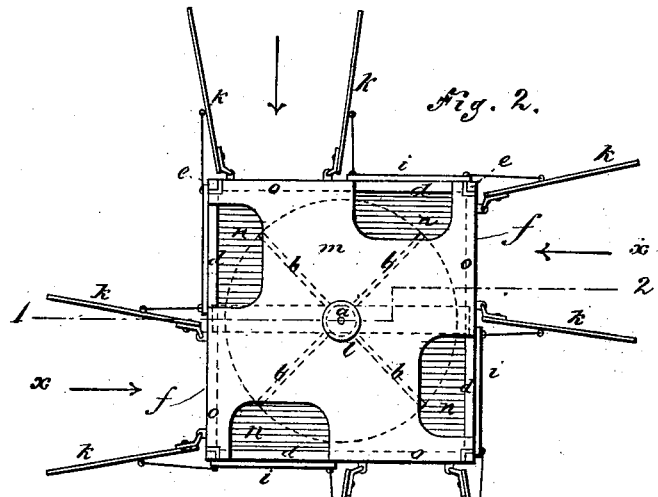
Figure 3:
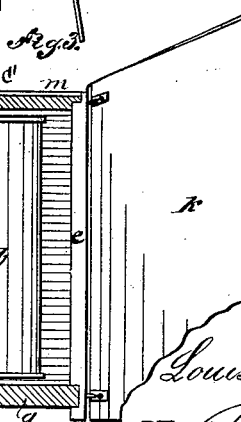

In the accompanying drawings, Figure 1 represents a side elevation of my improved wind-motor. Fig. 2 is a plan view of the same; and Fig. 3 is a vertical transverse section on line 1 to 2, Fig. 2.

Similar letters of reference indicate corresponding parts.

Referring to the drawings, $a$ represents a perpendicular shaft, which is provided with four or more fixed radial paddles, $b$. The shaft $a$ is supported by a step-bearing, $c$, in the bottom and by a bearing, $c'$, in the top of the casing or housing $d$, which is made of wood or iron, as desired. The casing shown in the drawings is constructed of vertical corner-posts $e$, which are rigidly connected by transverse pieces $f$ and braces $g$, so that the whole forms a square housing for the wheel. Each side wall of the casing $d$ is divided by means of intermediate posts into halves. One half of each side wall is closed by a removable panel, $i$, while the other remains open and is provided with hinged and braced outwardly-extending wings $k$, which diverge from each other and form the channels for conducting the wind to the wheel at the interior of the casing.

The arrows in Fig. 2 indicate the direction of motion of the wind as it enters the motor.

In the drawings the wheel at the interior of the casing turns in the direction of the arrow $x$; but the direction of motion can be readily reversed for the same direction of the current, as the apparatus admits the shifting of the position of the panels $i$ so as to close the portions of the side walls which were open before, leaving, therefore, the portions which were closed before open, the latter serving then, in connection with the wings, which are also transposed, as the conducting-channels for the wind.

By the changing of position of the removable panels $i$ and of the wings $k$ the direction of motion of the wheel can be reversed, whatever be the direction of the wind.

The shaft $a$ carries at its upper end a pulley, $l$, or other equivalent device for the transmission of power. It may be furthermore provided above the brace $g$ with a number of smaller paddles or wings of any desired form, which are acted upon directly by the wind, and which serve to augment the power of the mill.

The top $m$ of the casing A is provided with openings $n$, through which the air enters from above, so as to utilize thereby also the downward pressure of the wind.

Instead of supporting the wind-motor permanently in position, it may be supported on a circular track, by which the windmill may be set to better advantage for the different directions of the wind.

Having thus described my invention, I claim as new and desire to secure by Letters Patent—

1. As an improvement in windmills, the combination of an interior vertical wind-wheel, $a\ b$, with an inclosing-casing, $d$, having partly-open and partly-closed side walls, $d$, and top openings, *n*, and exterior wings, *k*, diverging from the open portions of the side walls, substantially as described.

2. As an improvement in windmills, the combination, with an interior wind-wheel, of an inclosing-casing having top openings, shifting side panels, and exterior diverging wings, substantially as and for the purpose set forth.

In testimony that I claim the foregoing as my invention I have signed my name, in presence of two witnesses, this 21st day of February, 1881.

LOUIS AD. PURPER.

Witnesses:
E. BOETTCHER,
ROBT. M. HOOPER.